United States Patent [19]

Vanderpool et al.

[11] Patent Number: 4,626,280
[45] Date of Patent: Dec. 2, 1986

[54] RECOVERY OF TUNGSTEN, SCANDIUM, IRON, AND MANGANESE FROM TUNGSTEN BEARING MATERIAL

[75] Inventors: Clarence D. Vanderpool; Martin B. MacInnis, both of Towanda; Judith A. Ladd, Sayre, all of Pa.

[73] Assignee: GTE Products Corporation, Stamford, Conn.

[21] Appl. No.: 838,482

[22] Filed: Jan. 24, 1986

[51] Int. Cl.$^4$ .................................................. C22B 3/00
[52] U.S. Cl. ............................. 75/101 R; 75/101 BE; 75/114; 75/108; 75/121; 423/21.1; 423/49; 423/51; 423/53; 423/57; 423/147; 423/150; 423/263
[58] Field of Search ................. 75/2, 101 R, 101 BE, 75/108, 114, 121; 423/2, 9, 21.1, 49, 50, 51, 53, 54, , 57, 150, 147, 263; 252/631, 634, 635; 376/184, 189, 323

[56] References Cited

U.S. PATENT DOCUMENTS

| | | | |
|---|---|---|---|
| 2,747,965 | 5/1956 | Daugherty | 423/51 |
| 3,582,290 | 6/1971 | Grinstead | 423/21.1 |
| 4,016,237 | 4/1977 | Mason et al. | 423/21.1 |

Primary Examiner—John Doll
Assistant Examiner—Robert L. Stoll
Attorney, Agent, or Firm—Donald R. Castle; L. Rita Quatrini

[57] ABSTRACT

A process is disclosed for recovering tungsten, iron, and manganese from tungsten bearing material. The process involves digesting the material in a sulfur dioxide solution at a sufficient temperature for a sufficient time to form a digestion solution containing the major portion of the scandium, iron, and manganese, and a digestion solid containing the major portion of the tungsten which is separated from the digestion solution. The major portion of the scandium is extracted from the digestion solution with an organic consisting essentially of an extracting agent which is essentially a mixture of alkyl primary amines which are present in an amount sufficient to extract the major portion of the scandium without extracting appreciable amounts of iron and manganese, and the balance an essentially aromatic solvent. After separation of the scandium containing organic from the raffinate, the organic is stripped of the scandium with hydrochloric acid which is then separated from the stripped organic. The raffinate is adjusted to a pH of at least about 3.5 with a base to precipitate the major portion of the iron and manganese which is separated from the resulting liquor. A sufficient amount of chlorine gas is contacted with an aqueous slurry of the precipitate at a sufficient temperature for a sufficient time to form a manganese containing solution containing the major portion of the manganese which was in the precipitate and a solid containing the major portion of the iron which was in the precipitate.

7 Claims, No Drawings

RECOVERY OF TUNGSTEN, SCANDIUM, IRON, AND MANGANESE FROM TUNGSTEN BEARING MATERIAL

BACKGROUND OF THE INVENTION

This invention relates to a process for recovering tungsten, scandium, iron, and manganese from tungsten bearing material.

In the processing of tungsten ores as scheelites, wolframites, etc. to recover tungsten, residues are generated which contain in addition to tungsten, valuable metals as scandium, iron, and manganese. The residues can also contain a number of other elements as calcium, niobium, arsenic, antimony, etc.

It would be desirable to recover these metals for reuse, and it would be highly desirable from an economic standpoint to recover these metals without using fusion or expensive reagents.

SUMMARY OF THE INVENTION

In accordance with one aspect of this invention there is provided a process for recovering tungsten, iron, and manganese from tungsten bearing material. The process involves digesting the material in a sulfur dioxide solution at a sufficient temperature for a sufficient time to form a digestion solution containing the major portion of the scandium, iron, and manganese, and a digestion solid containing the major portion of the tungsten which is separated from the digestion solution. The major portion of the scandium is extracted from the digestion solution with an organic consisting essentially of an extracting agent which is essentially a mixture of alkyl primary amines which are present in an amount sufficient to extract the major portion of the scandium without extracting appreciable amounts of iron and manganese, and the balance an essentially aromatic solvent. After separation of the scandium containing organic from the raffinate, the organic is stripped of the scandium with hydrochloric acid which is then separated from the stripped organic. The raffinate is adjusted to a pH of at least about 3.5 with a base to precipitate the major portion of the iron and manganese which is separated from the resulting liquor. A sufficient amount of chlorine gas is contacted with an aqueous slurry of the precipitate at a sufficient temperature for a sufficient time to form a manganese containing solution containing the major portion of the manganese which was in the precipitate and a solid containing the major portion of the iron which was in the precipitate.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The tungsten bearing material of this invention can be essentially any such material. The preferred material, however, is the residue that results from the processing of tungsten ores as scheelites, wolframites, etc. The ores are typically digested in sodium hydroxide to solubilize the tungsten as sodium tungstate. The residue from this process is the preferred starting material of this invention.

The tungsten bearing material typically contains in percent by weight about 21.1% Fe, about 20.1% Mn, about 0.06% Sc, and about 1.5% W.

The tungsten bearing material is first digested in a sulfur dioxide solution at a sufficient temperature for a sufficient time to form a digestion solution containing the major portion of the scandium, iron and manganese and a digestion residue containing the major portion of the tungsten. This is typicaly done by forming an aqueous slurry of the material and bubbling sulfur dioxide gas through the slurry. The typical temperatures are from about 80° C. to about 100° C. with from about 90° C. to about 95° C. being preferred. The time is typically about 48 hours.

The digestion solution is then separated from the digestion residue by any standard method such as by filtration.

The digestion residue can then be processed by standard methods such as by ore processing methods to recover the tungsten.

The major portion of the scandium is then extracted from the digestion solution with an organic solution consisting essentially of an extracting agent which is essentially a mixture of alkyl primary amines which are present in an amount sufficient to extract the major portion of the scandium without extracting appreciable amounts of iron and manganese, and the balance an essentially aromatic solvent.

The preferred alkyl primary amines are tertiary alkyl primary amines wherein the alkyl groups have from about 18 to about 22 carbon atoms. For example, the preferred formulas range from $C_{18}H_{37}NH_2$ to $C_{22}H_{45}NH_2$. A preferred source of such a mixture of primary amines having the aove formula ranges is supplied by Rohm and Haas Co. under the trade name of Primene JM-T. The extracting agent is selective for scandium over iron and manganese. The concentration of the extracting agent is therefore critical because at concentrations above the amount needed to extract the scandium, iron and manganese are extracted along with the scandium resulting in a less efficient separation of scandium from the iron and manganese. However, in accordance with the preferred embodiment of this invention, for the typical digestion solution relative concentrations of scandium, iron, and manganese, which will be apparent in the example, the preferred concentration of extracting agent is from about 10% to about 25% by volume of the organic solution.

The preferred essentially aromatic solvent consists essentially of a mixture of alkyl benzenes wherein the alkyl benzenes have molecular weights of 120, 134, or 148 and the total number of carbon atoms attached to the benzene ring is either 3, 4, or 5. Typical constituents include trimethyl benzene, ethyl benzene, dimethylethyl benzene, methyl propyl benzene, tetramethyl benzene, diethyl toluene, dimethylisopropyl benzene, and the like. The material is sold by Buffalo Solvents and Chemicals Corporation under the trade name of SC#150. In the 1972 edition of "Organic Solvents," a trade publication of Buffalo Solvents and Chemicals Corporation, SC#150 is listed as having a boiling point of from about 188° C. to about 210° C., a flash point of 151° F., and a specific gravity of about 0.891.

The resulting scandium containing organic is separated from the resulting raffinate which is essentially scandium free. A typical analysis of the raffinate is less than about 0.03 g Sc/l. The raffinate contains the major portion of the iron and manganese which were originally present in the digestion solution.

The preferred method of carrying out this step is by contacting a fresh aliquot of organic with the digestion solution followed by separating the resulting scandium-containing organic aliquot from the aqueous phase. The resulting aqueous phase can then be contacted with another fresh aliquot of organic and then separated from the organic. Separation is accomplished by allowing the organic and aqueous (raffinate) phases to physically disengage. The aqueous phase is then preferably drawn off from the organic phase through the bottom of an extraction cell. This process can be repeated any number of times, with the usual time being about 3, until essentially all of the scandium is removed from the digestion solution and is present in the organic aliquots. The organic aliquots can then be combined to form one scandium containing organic.

The scandium-containing organic is then stripped of essentially all of the scandium by contacting the organic with a hydrochloric acid solution preferably of from about 1 to about 4 normal to form a scandium-containing hydrochloric acid solution.

The scandium-containing hydrochloric acid solution is then separated from the resulting stripped organic by essentially the same phase disengagement technique described previously. The scandium can be recovered from this solution by conventional techniques. One such technique is by adding ammonium hydroxide to the solution to a pH of about 7 to precipitate the scandium as the hydroxide.

The scandium-free raffinate contains iron and manganese and is typically at a pH of about 2.8. The pH of this solution is adjusted to a pH of at least about 3.5 with a base which is preferably sodium hydroxide to precipitate the major portion of the iron and manganese essentially as their hydroxides.

The resulting iron and manganese precipitate is then separated from the resulting liquor by any standard technique such as filtration.

An aqueous slurry of the precipitate is then formed and the slurry is then contacted with a sufficient amount of chlorine gas at a sufficient temperature for a sufficient time to form a manganese containing solution containing the major portion of the manganese which was in the precipitate and an iron containing solid containing the major portion of the iron which was in the precipitate.

Typically chlorine gas is bubbled into the slurry which is at a temperature of from about 80° C. to about 95° C. for from about 2 hours to about 4 hours. In this step, the manganese is oxidized to a permanganate which is soluble in the resulting solution. The iron hydroxide is insoluble.

The permanganate solution can be processed by standard methods to recover the manganese.

The iron hydroxide can be processed by standard methods such as by reduction to iron powder.

The above described process affords an economic method of recovering tungsten, scandium, iron, and manganese without use of fushion or expensive reagents.

To more fully illustrate this invention, the following nonlimiting example is presented.

EXAMPLE

About 100 g of dry tungsten bearing material containing in percent by weight about 21.1% Fe, about 20.1% Mn, about 0.06% Sc, and about 1.5% W is slurried in about 900 cc of water through which sulfur dioxide gas is bubbled for about 48 hours under reflux at about 95° to 100° C. The resulting digestion solution is then filtered to remove the solution which contains the scandium from the solid material which contains the tungsten. About 72% of the material dissolves, leaving about 28 g of residue containing in percent by weight 22% Fe, about 0.64% Mn, about 7.1% W, and about 0.03% Sc. This represents essentially all of the starting tungsten, and the minor portions of the iron, manganese, and scandium.

The digestion solution, after all dilutions contains about 3.8 g Fe/l, 6.3 g Mn/l, about 0.04 g W/l, and about 0.03 g Sc/l. This brownish solution is then contacted three times with a 25% by volume primine JMT solution in SC#150 to extract the scandium. The organic portions are combined and then stripped of the scandium with about 30 cc portions of 2N HCl. To the scandium-containing HCl is then added $NH_4OH$ to a pH of about 7 to precipitate the scandium.

The raffinate contains about 3.6 g Fe/l, about 6.2 g Mn/l, less than about 0.01 g W/l, and less than about 0.01 g Sc/l which indicates that the major portion of the scandium is extracted and separated from the major portion of the iron and manganese. The raffinate is made strongly basic, by adjustment of the pH to about 11 with sodium hydroxide to precipitate iron and manganese hydroxides. An aqueous slurry is formed of the precipitate through which chlorine gas is bubbled for about 4 hours at about 80° to about 95° C. The slurry is then filtered. The resulting solution contains manganese as sodium permanganate. The resulting solid is essentially iron hydroxide. which is dried and reduced to iron powder.

What is claimed is:

1. A process for recovering tungsten, scandium, iron, and manganese from tungsten bearing material, said process comprising:
    (a) digesting said material in a sulfur dioxide solution at a sufficient temperature for a sufficient time to form a digestion solution containing the major portion of the scandium, iron and manganese and a digestion residue containing the major portion of the tungsten;
    (b) separating said digestion solution from said digestion residue;
    (c) extracting the major portion of the scandium from said digestion solution with an organic solution consisting essentially of an extracting agent which is essentially a mixture of tertiary alkyl primary amines which are present in an amount sufficient to extract the major portion of the scandium without extracting iron and manganese, and the balance an essentially aromatic solvent;
    (d) separating the resulting scandium containing organic from the resulting raffinate;
    (e) stripping essentially all of the scandium from the scandium-containing organic solution by contacting said scandium-containing organic solution with hydrochloric acid to form a scandium containing hydrochloric acid solution;
    (f) separating said scandium containing hydrochloric acid solution from the resulting stripped organic solution;
    (g) adjusting the pH of the raffinate to at least about 3.5 with a base to form a precipitate containing the major portion of the iron and manganesee which was in said aqueous phase;

(h) separating said precipitate from the resulting liquor;

(i) contacting chlorine gas with an aqueous slurry of said precipitate at a sufficient temperature for a sufficient time to form a manganese containing solution containing the major portion of the manganese which was in said precipitate and an iron solid containing the major portion of the iron which was in said precipitate.

2. A process of claim 1 wherein said material is digested at a temperature of from about 80° C. to about 100° C. for about 48 hours.

3. A process of claim 1 wherein said extracting agent is essentially a mixture of tertiary alkyl primary amines wherein the alkyl groups have from about 18 to about 22 carbon atoms.

4. A process of claim 3 wherein said essentially aromatic solvent consists essentially of a mixture of alkyl benzenes wherein the alkyl benzenes have molecular weights of 120, 134, or 148, and the total number of carbon atoms attached to the benzene ring are either 3, 4, or 5.

5. A process of claim 1 wherein the hydrochloric acid concentration is from about 1 normal to about 4 normal.

6. A process of claim 1 wherein said base is sodium hydroxide.

7. A process of claim 1 wherein an aqueous slurry of the precipitate containing iron and manganese is digested in chlorine gas at a temperature of from about 80° C. to about 95° C. for from about 2 to about 4 hours.

* * * * *